(12) United States Patent
Derezinski

(10) Patent No.: US 6,513,963 B2
(45) Date of Patent: Feb. 4, 2003

(54) MULTI-STAGED VENTED EXTRUSION SCREW WITH DUAL CHANNEL DEPTH PUMPING SECTION

(75) Inventor: Stephen J. Derezinski, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/766,199

(22) Filed: Jan. 19, 2001

(65) Prior Publication Data

US 2002/0136084 A1 Sep. 26, 2002

(51) Int. Cl.[7] ................................. B29B 7/42
(52) U.S. Cl. .................................... 366/89
(58) Field of Search ................ 366/75, 79, 83–85, 366/88, 89, 323; 425/204, 208, 209

(56) References Cited

U.S. PATENT DOCUMENTS

| | | | |
|---|---|---|---|
| 3,023,456 A | | 3/1962 | Palfey |
| 3,170,190 A | * | 2/1965 | Fields |
| 3,248,469 A | | 4/1966 | Kosinsky et al. |
| 3,355,769 A | | 12/1967 | Fogelberg |
| 3,698,541 A | | 10/1972 | Barr |
| 3,712,594 A | | 1/1973 | Schippers et al. |
| 3,712,776 A | * | 1/1973 | Woodham et al. |
| 3,949,973 A | | 4/1976 | Bishop et al. |
| 4,049,245 A | | 9/1977 | Tadmor et al. |
| 4,053,143 A | * | 10/1977 | Hosokawa et al. |
| 4,155,655 A | | 5/1979 | Chiselko et al. |
| 4,185,060 A | | 1/1980 | Ladney, Jr. |
| 4,250,132 A | | 2/1981 | Beach |
| 4,409,165 A | | 10/1983 | Kim |
| 4,648,827 A | | 3/1987 | Laimer et al. |
| 4,708,617 A | | 11/1987 | Herrington |
| 4,867,927 A | | 9/1989 | Funaki et al. |
| 5,017,015 A | * | 5/1991 | Schlumpf et al. |
| 5,056,925 A | * | 10/1991 | Klein |
| 5,597,525 A | | 1/1997 | Koda et al. |
| 6,129,873 A | * | 10/2000 | Shelby et al. |
| 6,164,810 A | | 12/2000 | Derezinski |

OTHER PUBLICATIONS

E. C. Bernhardt, Dr. Ing., Processing of Thermoplastic Materials, 1959, pp. 164, 173–175.

* cited by examiner

*Primary Examiner*—Charles E. Cooley
(74) *Attorney, Agent, or Firm*—Mark G. Bocchetti (57) ABSTRACT

A vented, multi-staged rotary screw extruder is taught for extruding thermoplastic materials. The screw has a final pumping-section of the screw that includes two or more channel depths which provides exit-pressure and flow stability. The channel-depth of the first segment of the final pumping-section is deeper than the channel depth of the second segment of the final pumping-section. The axial length of the first segment is preferably about two-thirds (⅔) of the final pumping-section length. The deeper first channel-depth acts as a reservoir resulting in smaller fluctuations in axial final fill-length as the input flow to the total pumping-section varies. The second channel-depth in the remaining approximate one-third (⅓) of the total pumping-section is preferably sized so as to optimize pressure development.

16 Claims, 4 Drawing Sheets

MULTI-STAGED VENTED EXTRUSION SCREW WITH DUAL CHANNEL DEPTH PUMPING SECTION

FIELD OF THE INVENTION

The present invention relates generally to polymer extrusion apparatus, and, more particularly, to multi-staged rotary screw extruders for polymer extrusion.

BACKGROUND OF THE INVENTION

A variety of extrusion apparatus for injection molding thermoplastic materials are known in the prior art. Examples of such extrusion apparatus include U.S. Pat. No. 3,023,456 to Palfey, U.S. Pat. No. 4,155,655 to Chiselko et al., U.S. Pat. No. 4,185,060 to Ladney, Jr., and U.S. Pat. No. 5,597,525 to Koda et al. As shown in such patents, a common method for extracting vapors and gases during the extrusion process is to use a vented extruder. Venting is done in an extraction section or sections, and it can be to low pressure or to a vacuum. After the venting, a final pumping-section must develop pressure according to the load at the extruder exit. It must carry the flow rate of the extruder and build the pressure (from vacuum or low pressure) to the required exit pressure (e.g. die pressure required for extrusion).

In the final extraction section, where vapors are released to vacuum or low pressure, the polymer traveling in the channel must include an unbounded surface so that the gases may escape and travel to a vent port in the extrusion screw or in the barTel. This unbounded surface requires that the screw channel be only partially filled with polymer, and this unbounded surface will continue into the final pumping-section for a distance that is dependent upon the exit pressure of the extruder. At some distance along the length of the screw, the unbounded surface ends and the screw channel(s) are filled such that polymer traveling in the channel is fully bounded. The screw channels in the final pumping-section are completely full of polymer.

The axial length of the final pumping-section that is completely full of polymer is proportional to the exit pressure being developed. If the exit pressure is low, then the pumping section will have a very short length of fill. As the pressure is increased (greater load on the extruder), the length of the final pumping-section that is completely fall will become longer.

Theory and practice have shown that the optimum final pumping-section for a two-stage extruder (a final pumping-section that builds the pressure in the shortest length of the extruder) has a channel depth that is greater than that of the metering section (in the first stage of the extruder). For a square pitched screw as shown in U.S. Pat. No. 3,023,456 to Palfey (channel lead length equal to barrel diameter, channel lead length being the axial distance between flights), the pumping section depth must be 50% greater than the metering-section depth of the first stage for optimum pressure development. The so defined optimum channel-depth of the final pumping-section maximizes the pressure capability of the extruder. Subsequent vented extruder designs, such as those mentioned above, have specifically stated and followed the configuration of a single channel-depth final pumping-section as given by Palfey. Further, none of such prior art designs address the issue of pressure stability.

Pressure stability is addressed for extrusion in U.S. Pat. No. 4,867,927 to Funaki et al. and U.S. Pat. No. 3,712,594 to Schippers et al. In the apparatus taught by Funaki et al. (which does not include venting) a flow restriction is added to the screw to dampen the flow oscillations. A valve mechanism on the axis of the screw in the screw core and controllable from outside the extruder is used by Schippers et al. to dampen the flow oscillations. Screws with metering sections are used for plasticating with features that do not include venting or degassing. Specifically, reference U.S. Pat. No. 3,698,541 to Barr and U.S. Pat. No. 4,049,245 to Tadmor et al.. Both appear to show barrier type screws that include a constant channel-depth final pumping-section. However, neither Barr nor Tadmor et al. utilize the double channel-depth final pumping-section, or address stability of flow or pressure.

In a non-continuous process (as opposed to a continuous process for which venting here is required) taught in U.S. Pat. No. 4,648,827 to Laimer et al., a screw for injection molding does use a tapered channel-depth in the final pumping-section of the screw. However, Laimer et al. teaches a non-vented design, and the channel depth is not two distinct values. Additionally, since Laimer et al. is a non-continuous injection molding application, flow stability is not a concern.

The flow of polymer in a vented multi-stage extruder has inherent instability, typically in but not limited to, the solids conveying and melting processes therein. As the flow enters the final pumping-section, flow rate variation will cause the inventory of polymer in the final pumping-section to fluctuate. This fluctuation of inventory results in a change in the fill length of the final pumping-section. Since the final pumping-section fill-length is a factor in determining the exit pressure from the extruder, the exit pressure will also vary accordingly. Exit pressure instability in proportion to final fill-length variability of the final pumping-section is the end result. Thus, the prior art fails to teach a vented screw design in which the final pumping-section of the screw includes two or more channel depths in order to provide flow stability in continuous extrusion operations.

SUMMARY OF THE INVENTION

It is therefore an object of the present invention to provide a vented, multi-staged rotary screw extruder for polymer extrusion that allows for flow stability in continuous extrusion operations.

Another object of the present invention is a vented, multi-staged rotary screw extruder wherein the final pumping-section of the screw includes two or more channel depths in order to provide flow stability in continuous extrusion operations.

Briefly stated, the foregoing and numerous other features, objects and advantages of the present invention will become readily apparent upon a review of the detailed description, claims and drawings set forth herein. These features, objects and advantages are accomplished by providing a vented, multi-staged rotary screw extruder with a final pumping-section of the screw that includes two or more channel depths. Two or more channel depths in the final pumping-section of a multi-staged vented extruder improves exit-pressure and flow stability. The channel-depth of the first portion of the final pumping-section is deeper than the second portion of the final pumping-section. The axial length of the first portion of the final pumping-section is preferably about two-thirds ($2/3$) of the final pumping-section length. The deeper first channel-depth acts as a reservoir resulting in smaller fluctuations in axial final fill-length as the input flow to the final pumping-section varies. The second channel-depth in the remaining approximate one-third ($1/3$) of the total pumping-section is preferably sized so as to optimize pressure development. Therefore, exit-pressure stability is achieved by the depth of the first channel in the final pumping-section, and optimum pressure development is produced by the depth of the second channel in the final pumping-section thereby providing flow stability in continuous extrusion operations.

DETAILED DESCRIPTION OF THE INVENTION

Figure 1:
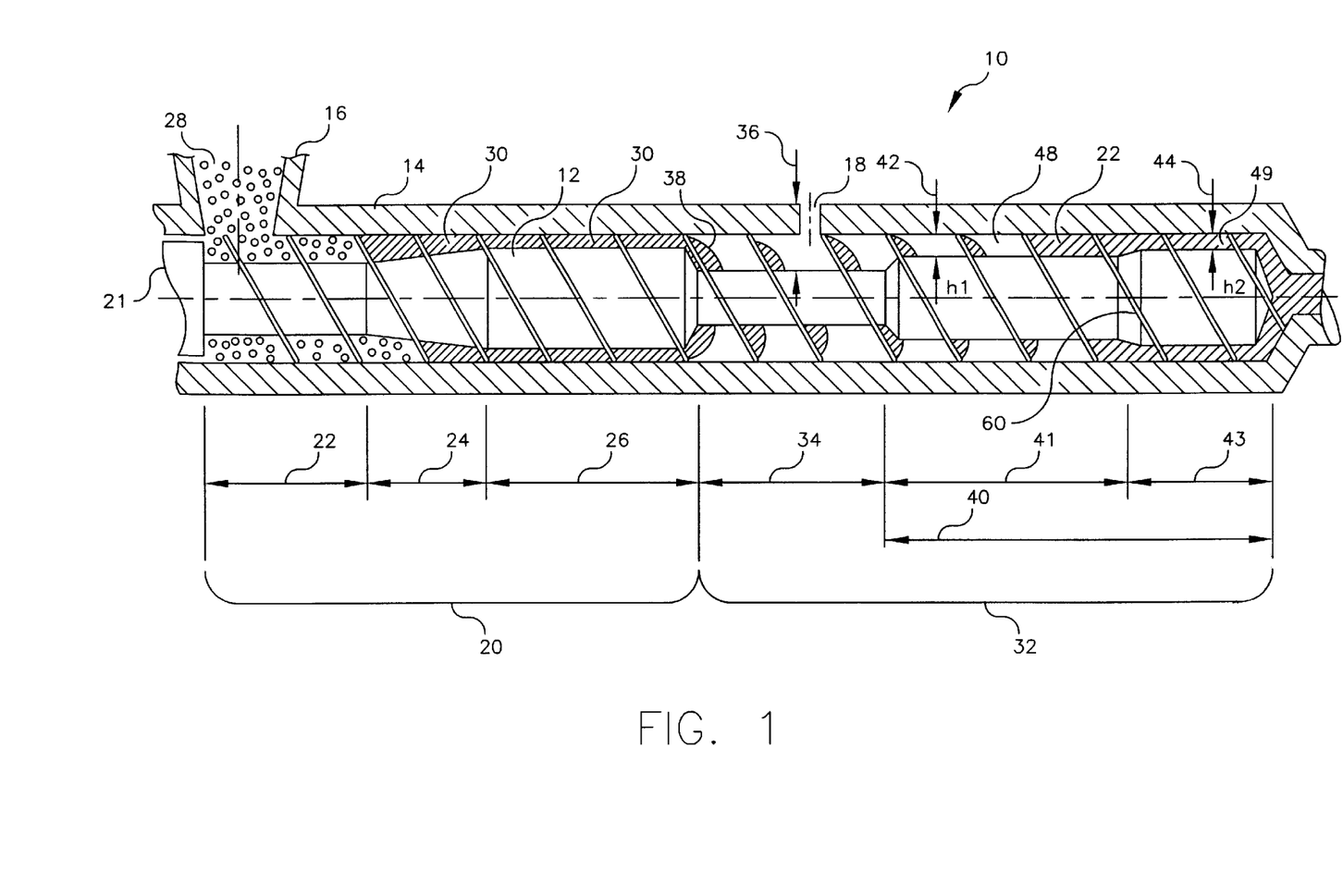
FIG. 1 is a partial cross-sectional view of the vented two-stage extruder of the present invention.

Turning first to FIG. 1, there is shown the vented two-stage extruder 10 of the present invention. Extruder 10 includes a screw 12 rotatably supported in a barrel 14. Barrel 14 includes a solids feed hopper 16 and a vent 18 for venting gases and vapors from extruder 10. A vented screw such as taught in U.S. Pat. No. 6,164,810 could be used as well. A screw with more than one vent (multi-staged vented) would also apply. The screw 12 is shown with a conventional first stage 20 that includes a drive end 21, a solids conveying section 22, a melting section 24 and metering section 26. Solid thermoplastic material 28 (typically in a pelletized form) is delivered to extruder 10 via feed hopper 16. The solid thermoplastic material 28 becomes a melted polymer 30 in the melting section 24. The second stage 32 of the screw 12 includes an extraction section 34 with its deep channel 36 to create the unbounded surface 38 for vapor release and transport to the vent 18. The second stage 32 includes the final pumping-section 40 of the screw 12. As depicted, final pumping-section 40 includes an initial or reservoir segment 41 having screw channels 48 with a channel-depth 42. Final pumping-section 40 also includes a second segment 43 having screw channels 49 with a screw channel-depth 44. Channel-depth 44 is less than the channel-depth 42.

Figure 2:
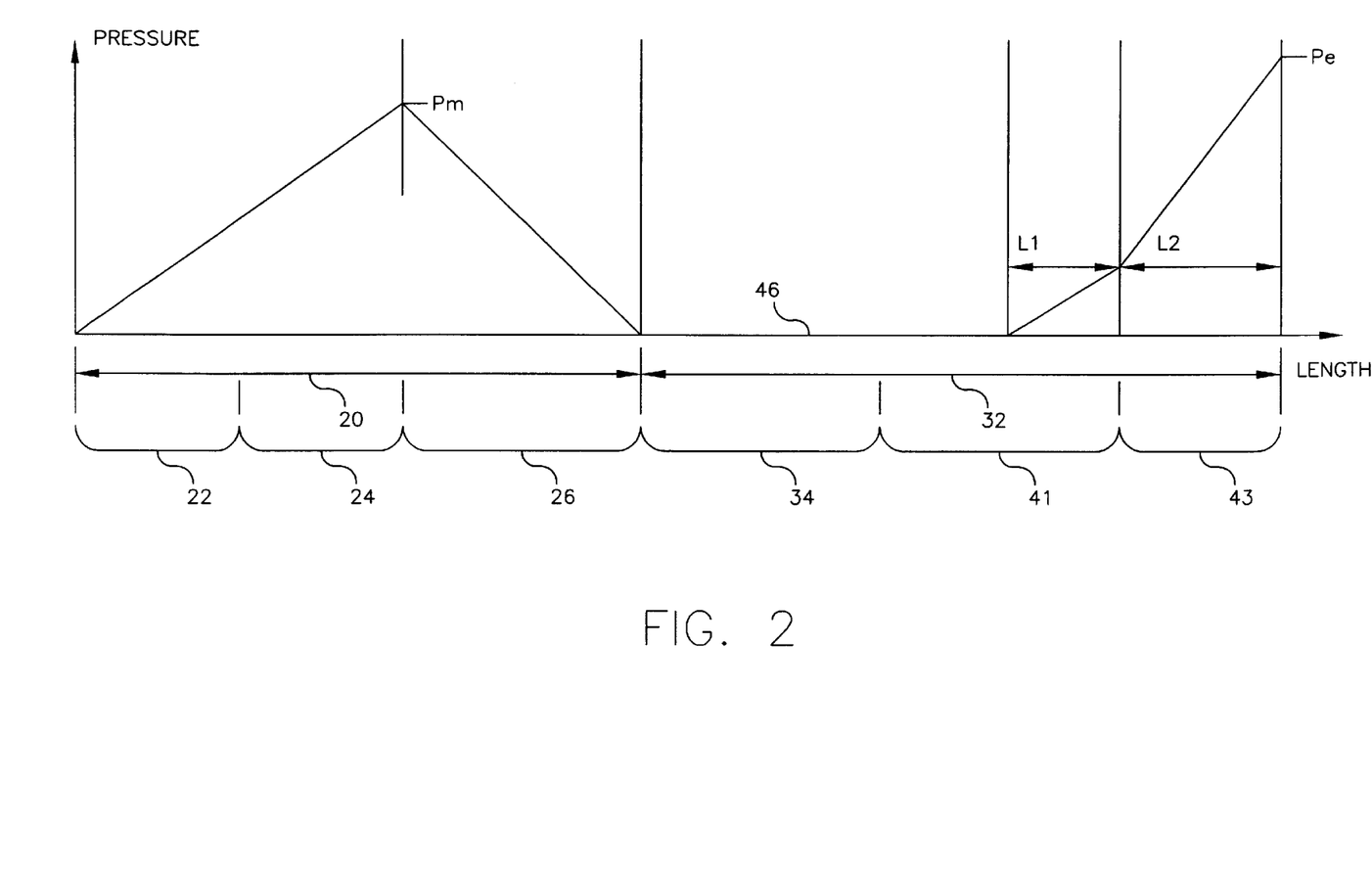
FIG. 2 is a pressure profile for the vented two-stage extruder shown in FIG. 1.

Looking next at FIG. 2, there is shown a pressure profile for the extruder 10 shown in FIG. 1. The pressure of the solids conveying section 22 and melting section 24 is shown as building linearly to a pressure $P_m$. Extruder 10 is vented through vent 18 in the extraction section 34 preferably with the aid of a vacuum pump (not shown) to achieve a sub-atmospheric pressure 46. However, extraction section 34 may also be operated at atmospheric or low pressures (above atmospheric) for some applications. The unbounded surface 38 of the polymer 30 continues into the final pumping-section 40. In operation, some of the screw channels 48 in the initial or reservoir segment 41 eventually fill with polymer melt 30 at a fill length, $L_1$, from the end of the initial or reservoir segment 41. In operation, the screw channels 49 of the second segment 43 of the final pumping-section 40 are full of polymer. The second segment 43 has a length $L_2$. An exit pressure $P_e$ is attained.

Figure 3:
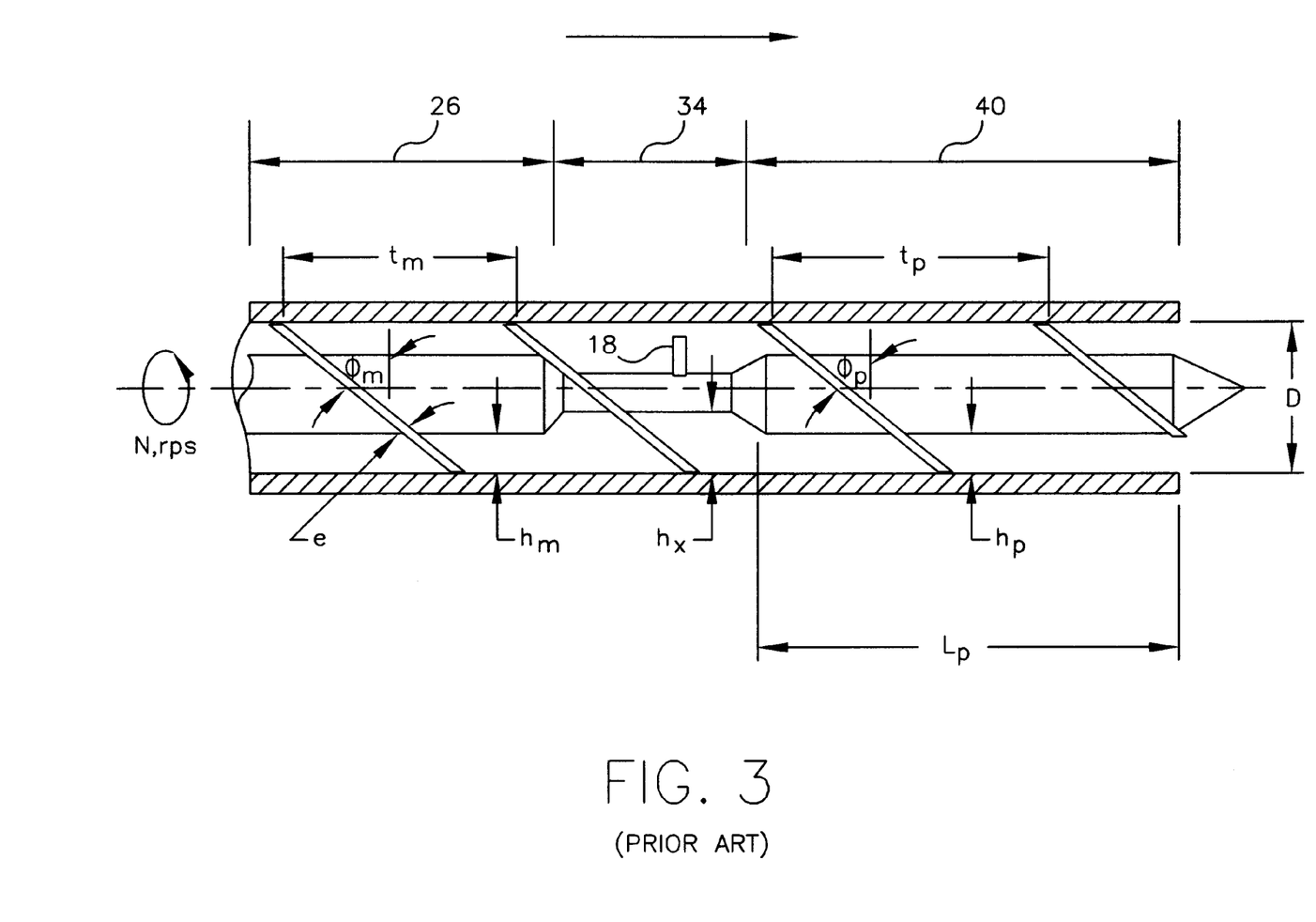
FIG. 3 is a schematic cross-sectional representation of a prior art extruder screw.

Looking at FIG. 3, in the prior art, the channel depth of the pumping section of an extruder screw, $h_p$, is set as a constant over the entire length, $L_p$, of the pumping section. An optimum depth of this channel for maximum pressure gradient is given by *Processing of Thermoplastic Materials*, by Ernest C. Bernhardt from the following ratio:

$$\frac{h_{p\max}}{h_m} = 1.5. \qquad \text{Eq. 1}$$

where $h_{Pmax}$ is the depth of the screw channel in the pumping section for maximum pressure development and $h_m$ is the depth of the screw channel in the metering section. This assumes that the lead length of the pumping section, $t_p$, is the same as the lead length of the metering section, $t_m$.

The results of Bernhardt are extended to include lead length difference between pumping and metering. Based on his one-dimensional isothermal flow equations for flow and pressure gradient in extruder screws, the pressure gradient for a given flow in the pumping section following an extraction section and metering section with the same flow is given as $$\frac{\Delta p}{\Delta L} = \frac{6\pi DN\mu[h_p(t_p - ne)\cos^2(\phi_p) - h_m(t_m - ne)\cos^2(\phi_m)]}{h_p^3(t_p - ne)\sin(\phi_p)\cos(\phi_p)}, \qquad \text{Eq. 2}$$

where the helix angles ($\Phi_m$, $\Phi_p$) for the metering channel (subscript m) or the pumping channel (subscript p), of different lead lengths, $t_m$ and $t_p$ are given by $$\phi_i = \tan^{-1}(t_i/\pi D) \qquad \text{Eq. 3}$$

where i=m or p.

Similar to Equation 1, channel depth for maximum pressure gradient is then determined by optimization of Equation 2 to give $$\left(\frac{h_p}{h_m}\right)_{\max} = \frac{3}{2}\frac{(t_m - ne)\cos^2(\phi_m)}{(t_p - ne)\cos^2(\phi_p)}, \qquad \text{Eq. 4}$$

Equation 4 becomes the Bernhardt result of Equation 1 for equal leads (and helix angles). These four equations are used to size the two channel-depth pumping-section.

Figure 4:
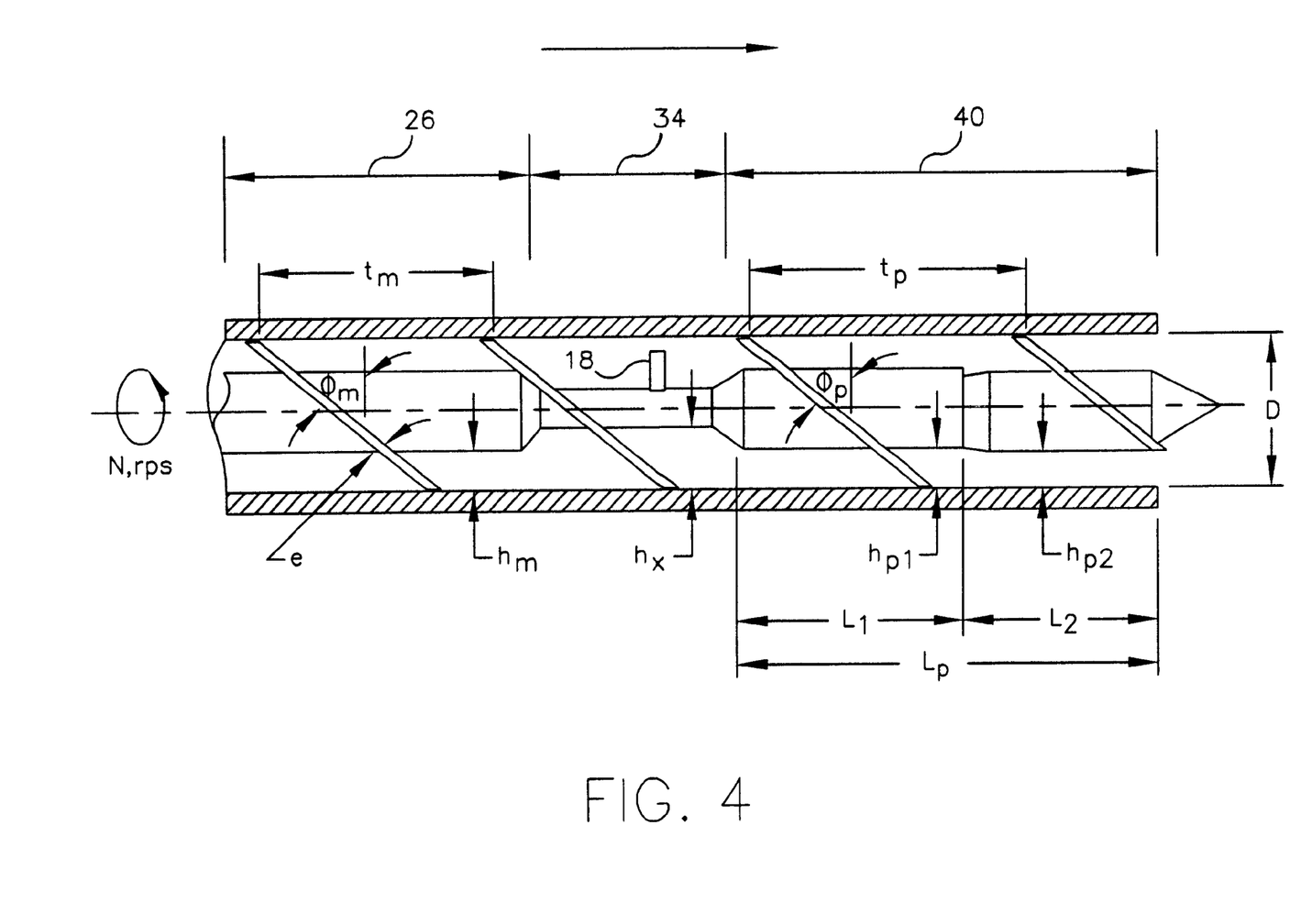
FIG. 4 is a schematic cross-sectional representation of a portion of the vented two-stage extruder of the present invention.

FIG. 4, which schematically shows part of the extruder screw 12 shown in FIG. 1 with flights to form a helical path inside in barrel 14 having an inside diameter, D, will be used to describe the sizing of a two-channel depth final pumping section 40. That portion of the screw 12 shown in FIG. 4 is comprised of several sections 26, 34, 41, 43, each with its own channel depth, h, and lead length, t. The entire screw 12 contains a solids conveying and melting section (not shown in the FIG. 4). The screw may also contain other sections that are not shown. The elements shown in the FIG. 4 are those pertinent to a two channel-depth final pumping section 40. The pertinent sections are the metering section 26, extraction section 34, and pumping section 40.

Determining the proper sizing of the two-channel pumping section 40 of the present invention requires additional calculations. The requirements are that the pumping section 40 must produce a pressure between a minimum pressure, $P_{min}$, and a maximum pressure, $P_{max}$, at the extruder design flow rate and at a rotational speed, N. The total length of the pumping section is $L_p$, (see FIG. 4) and the average viscosity of the polymer in the pumping section is $\mu_p$. From other considerations, typically flow rate and product melt temperature development, the channel depth and lead length of the metering section 26 and the lead length of the pumping section 40 are previously calculated.

First, the optimum channel depth for pumping pressure development, $h_{pmax}$, is obtained from Equation 4. Equation 2 is then used to find the maximum pressure gradient. The length, $L_2$, of the second segment 43 of the two-channel depth pumping-section 40 is found by assuming the channels 49 of the second segment 43 to be completely full at minimum pressure. The length is then given as $$L_2 = \frac{p_{\min}}{(\Delta p / \Delta L)_{hp=hp\max}}. \qquad \text{Eq. 5}$$

The first length of the pumping section is then simply $$L_1 = L_p - L_2, \qquad \text{Eq. 6}$$

where $L_1$ is the length of the initial segment 41 of the pumping section 40.

The maximum pressure will be realized when the total pumping section 40 is completely full. This will require the pressure gradient ($\Delta P/\Delta L$) of the initial segment 41 of the pumping section 40 to be given by $$\left(\frac{\Delta p}{\Delta L}\right)_1 = \frac{(p_{\max} - p_{\min})}{L_1}, \qquad \text{Eq. 7}$$

where $P_{max}$ is the maximum pressure that the extruder will need to produce and $P_{min}$ is the pressure that will keep the second segment of the pumping section fill of polymer.

The pressure gradient of Equation 7 must be less than the maximum pressure gradient found previously using Equation 2. Otherwise, the length, $L_1$, is insufficient, and a longer total pumping section will be needed. Equation 2 can then be used with the result of Equation 7 to find the depth of screw channel 48 of the initial segment 41 of the pumping section 40. This is done by computational trial-and-error of Equation 2 with values of $h_1$ until the result of Equation 7 is obtained. This value of channel depth, $h_1$, of the of the initial segment 41 will be greater than the channel depth, $h_2$, of the second segment 43 and less than the channel depth, $h_x$, of the extraction section 34. The depth, $h_x$, of the extraction section 34 is suggested by Bernhardt to be four (4) times the depth, $h_m$, of the metering section 26. Therefore, $$2h_m \leq h_1 < 4h_m \qquad \text{Eq. 8}$$

Also, $$h_2 = 1.5 \times h_m \qquad \text{Eq. 9}$$

for equal channel lead lengths $t_m$ and $t_p$, or $$h_2 = \frac{3}{2} \frac{(t_m - ne)\cos^2(\phi_m)}{(t_p - ne)\cos^2(\phi_p)} \times h_m, \qquad \text{Eq. 10}$$

for unequal lead lengths $t_m$ and $t_p$.

Since these values are based on one-dimensional isothermal flow theory, the values may be found to be slightly different based on actual operational data.

EXAMPLE

A two-channel pumping section 40 is to be sized. The lengths of the initial segment 41 and the second segment 43 of the pumping section 40 and the channel depths ($h_1$ and $h_2$) are to be determined. The extruder 10 has the specifications shown in the table.

| Nomenclature | Name | Value |
| --- | --- | --- |
| D | Diameter | 200 mm |
| $t_m$ | Metering lead length | 200 mm |
| $h_m$ | Metering channel depth | 5 mm |
| n | Number of flights | 1 |
| e | Flight width | 12 mm |
| $t_p$ | Pumping lead length | 250 mm |
| $L_p$ | Pumping section length | 1500 mm |
| N | Screw speed | 2 rps |
| $P_{max}$ | Maximum pressure | 20 MPa |
| $P_{min}$ | Minimum pressure | 7 MPa |
| $\mu_p$ | Viscosity | 100 Pa-s |

First, Equation 3 is used to calculate the helix angles ($\Phi_m$, $\Phi_p$) for screw 12 as $$\Phi_{m=tan}{}^{-1}(200|\pi|200)-0.308 \text{ rad}, \qquad \text{Eq. 11}$$

and $$\phi_p 32 \tan^{-1}(250|\pi|200)=0.379 \text{ rad}. \qquad \text{Eq. 12}$$

The ratio of channel depth ($h_1$) of the initial segment 41 of the pumping section 40 to the channel depth ($h_m$) of the metering section 26 for optimum pressure gradient is then used to find the channel depth ($h_2$) of the second segment 43 of the pumping section 40 from Equation 4 as $$\frac{h_2}{h_m} = \frac{h_{p\max}}{h_m} = \frac{3}{2} \frac{(200.-12.)\cos^2(.308)}{(250-12)\cos^2(.379)} = 1.25. \qquad \text{Eq. 13}$$

The value of the channel depth ($h_2$) is then $$h_2 = 1.25 \times 5 = 6.25 \text{ mm}. \qquad \text{Eq. 14}$$

Equation 2 then gives the optimum pressure gradient for the channel depth ($h_2$) as $$\left(\frac{\Delta p}{\Delta L}\right)_2 = \frac{6\pi(200)(2)(100)[6.25(250-12)\cos^2(0.379) - 5(200-12)\cos^2(.308)]}{6.25^3(250-12)\sin(0.379)\cos(0.379)} \qquad \text{Eq. 15}$$
$$= 16269 \text{ Pa/mm}$$

The minimum pressure for this example as given above is 7 Mpa. Therefore, Equation 5 gives the length of the second segment 43 as $$L_2 = \frac{7e10^6}{16269} = 430 \text{ mm}. \qquad \text{Eq. 16}$$

The length of the initial segment 41 is then given by Equation 6 as $$L_1 = 1500 - 430 = 1070 \text{ mm}. \qquad \text{Eq. 17}$$

The length of the initial segment 41 is about twice that of the second segment 43. This means that the length of the pumping section is adequate to produce the maximum pressure, 20 Mpa, required.

The pressure gradient for the initial segment 41 then obtained from Equation 7 as $$\left(\frac{\Delta p}{\Delta L}\right)_1 = \frac{(p_{max} - p_{min})}{L_1} = \frac{(20e6 - 7e6)}{1070} = 12152 \text{ Pa/mm.} \quad \text{Eq. 18}$$

Finally, the channel depth ($h_1$) for the initial segment 41 is found by trial-and-error using Equation 2 and the result of Equation 18. The result for a channel depth ($h_1$) of 9.5 mm is $$\left(\frac{\Delta p}{\Delta L}\right)_1 = \frac{6\pi(200)(2)(100)[9.5(250-12)\cos^2(0.379) - 5(200-12)\cos^2(.308)]}{9.5^3(250-12)\sin(0.379)\cos(0.379)} \quad \text{Eq. 19}$$

$$= 11816 \text{ Pa/mm}$$

This pressure gradient is close to the desired value of Equation 18. Therefore, the channel depth ($h_1$) of the initial segment 41 is 9.5 mm. It is approximately twice the depth ($h_m$) of the channel (5 mm) in the metering section 26 as required by Equation 8. The result is that the pumping section 40 will have an initial segment 41 having a length ($L_1$) of 1070 mm and a channel depth ($h_1$) of 9.5 mm. The second segment 43 of the pumping section 40 will have a channel depth ($h_2$) of 6.25 mm and a length ($L_2$) of 430 mm. The length of the initial segment 41 will be foreshortened to accommodate a tapered transition section 60 (which may be, for example, frusto-conical in shape) of about 50 mm for the change in channel depth from 9.5 mm to 6.25 mm. Therefore, the total pumping section 40 is made up of a 1020 mm long part at a depth of 9.25 mm, a 50 mm long transition, and a 430 mm long part at a channel depth of 6.25 mm.

The vented multi-stage extruder of the present invention creates a more stable flow rate and exit pressure. Used in conjunction with a feedback control system, this translates into a more constant operating speed for the screw as well as a more constant operating pressure. Product uniformity is enhanced by constant exit pressure. Any auxiliary metering system used to dampen the output of any vented extruder with this dual-channel depth pumping design of this invention (screw or melt pump) will more easily dampen pressure fluctuations because such fluctuations will be smaller.

The improved stability will provide an increased rate. A screw speed (which is under feedback control) will have less variation if the pressure is inherently more constant. This means that the practical maximum speed will be closer to the maximum speed of the screw drive because excess speed will not be needed to keep the exit pressure constant. A higher rate of rotation is then possible for a particular screw having a maximum drive speed.

If an existing auxiliary metering extruder is used to further dampen the pressure, the maximum capacity of the existing auxiliary metering extruder will be increased. The reason is that the channel depth for an existing auxiliary metering extruder screw must be minimized to dampen pressure surges from the plasticator. Therefore, minimum metering-screw channel-depth (for acceptable thickness uniformity) limits flow rate. The improved pressure stability of the dual channel-depth screw design of plasticator permits use of a metering screw with a deeper channel-depth, hence a greater rate for a given size of the metering extruder.

Although the present invention may be practiced by building a new extruder apparatus as described herein, those skilled in the art will recognize that the present invention is also applicable to existing extruder apparatus. Many existing extruder apparatus can be fitted with a new screw designed in accordance with the present invention and thereby achieve the benefits described herein. This will not be universally true in that some existing extruder apparatus may have insufficient barrel length, diameter, or rotational speed to receive a screw designed to practice the present invention.

As noted above, the length of the initial segment 41 preferably should be about two times the length of second segment 43. However, for purposes of practicing the present invention it is believed that the length of the initial segment 41 can be from about 1.5 to about 2.5 times the length of second segment 43. Also as noted above, the channel depth $h_1$ of channels 48 preferably should be about two times the channel depth $h_2$ of channels 49. However, for purposes of practicing the present invention it is believed that the channel depth $h_1$ of channels 48 can be from about 1.5 to about 2.5 times the channel depth $h_2$ of channels 49.

Although the preferred embodiment as discussed herein has a pumping section 40 with an initial segment 41 and a second segment 43, those skilled in the art will recognize that pumping section 40 can be modified to include more than two segments. In other words, for example, the pumping section may be designed to include three segments, with each succeeding segment having a channel depth that is shallower than the channel depth of the preceding segment. Further, instead of three (3) or multiple steps in the channel depth, the initial segment 41 could also be made to have its channel depth continuously decrease from entrance to exit to provide a change in channel depth according to a prescribed (and probably linear) tapering function.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in an illuminating sense.

| PARTS LIST | |
|---|---|
| 10 | vented two-stage extruder |
| 12 | screw |
| 14 | barrel |
| 16 | solids feed hopper |
| 18 | vent |
| 20 | first stage |
| 21 | drive end |
| 22 | solids conveying section |
| 24 | melting section |
| 26 | metering section |
| 28 | solid thermoplastic material |
| 30 | melted polymer |
| 32 | second stage |
| 34 | extraction section |
| 36 | deep channel |
| 38 | unbounded surface |
| 40 | final pumping section |
| 41 | initial reservoir segment |
| 42 | channel depth |
| 43 | second segment |
| 44 | channel depth |
| 46 | sub-atmospheric pressure |
| 48 | screw channels |

-continued

PARTS LIST

| 49 | screw channels |
| 60 | frusto-conical transition section |

What is claimed is:

1. A rotary screw extrusion apparatus for extruding thermoplastic material comprising:
   (a) a barrel having a generally cylindrical chamber with a feed opening through the barrel into the generally cylindrical chamber; and
   (b) a screw rotatably residing in the generally cylindrical chamber, the screw including a drive end, a feed section, a melting section, a metering section, an extraction section, and a pumping section, the feed section residing between the drive end and the melting section, the melting section residing between the feed section and the metering section, the metering section residing between the melting section and the extraction section, the extraction section residing between the metering section and the pumping section, the pumping section including an initial segment having a first screw channel depth and a second segment having a second screw channel depth, the first screw channel depth being greater than the second screw channel depth, the initial segment having a length that is in the range of from about 1.5 to about 2.5 times a length of the second segment, and the extraction section having a screw channel depth that is greater than the first and second screw channel depths.

2. A rotary screw extrusion apparatus as recited in claim 1 further comprising:
   at least one vent hole through the barrel, the vent hole positioned proximate to the extraction section.

3. A rotary screw extrusion apparatus as recited in claim 1 wherein:
   the first screw channel depth is about two times the second screw channel depth.

4. A rotary screw extrusion apparatus as recited in claim 3 wherein:
   a metering section screw channel depth is less than the first screw channel depth.

5. A rotary screw extrusion apparatus as recited in claim 1 wherein:
   the pumping section of the screw includes a tapered transition section between the initial segment and the second segment.

6. A rotary screw extrusion apparatus as recited in claim 1 wherein:
   the first screw channel depth is in the range of from about 1.5 to about 2.5 times the second screw channel depth.

7. A rotary screw extrusion apparatus as recited in claim 1 wherein:
   the length of the initial segment is about two times the length of the second segment.

8. A rotary screw extrusion apparatus for extruding thermoplastic material comprising:
   (a) a barrel having a generally cylindrical chamber with a feed opening through the barrel into the generally cylindrical chamber; and
   (b) a screw rotatably residing in the generally cylindrical chamber, the screw including a drive end, a feed section, a melting section, a metering section, an extraction section, and a pumping section, the pumping section including an initial segment having a first screw channel depth and a second segment having a second screw channel depth, the first screw channel depth being greater than the second screw channel depth, the initial segment having a length that is in the range of from about 1.5 to about 2.5 times a length of the second segment, and the extraction section having a screw channel depth that is greater than the first and second screw channel depths.

9. A rotary screw extrusion apparatus as recited in claim 8 further comprising:
   at least one vent hole through the barrel, the vent hole positioned proximate to the extraction section.

10. A rotary screw extrusion apparatus as recited in claim 8 wherein:
    the first screw channel depth is about two times the second screw channel depth.

11. A rotary screw extrusion apparatus as recited in claim 10 wherein:
    a metering section screw channel depth is less than the first screw channel depth.

12. A rotary screw extrusion apparatus as recited in claim 8 wherein:
    the pumping section of the screw includes a tapered transition section between the initial segment and the second segment.

13. A rotary screw extrusion apparatus as recited in claim 8 wherein:
    the first screw channel depth is in the range of from about 1.5 to about 2.5 times the second screw channel depth.

14. A rotary screw extrusion apparatus as recited in claim 8 wherein:
    the length of the initial segment is about two times the length of the second channel.

15. A method extruding a thermoplastic material through a rotary screw extruder comprising the steps of:
    (a) delivering synthetic resinous material through a feed opening in a barrel, the barrel having a generally cylindrical chamber in which a screw rotatably resides;
    (b) rotating the screw to drive the synthetic resinous material from a feed section of the screw through a melt section, a metering section and an extraction section to a pumping section of the screw; and
    (c) pumping melted synthetic resinous material with the pumping section, the pumping section including an initial segment having a first screw channel depth and a second segment having a second screw channel depth, the first screw channel depth being greater than the second screw channel depth, the initial segment having a length that is in the range of from about 1.5 to about 2.5 times a length of the second segment, and the extraction section having a screw channel depth that is greater than the first and second screw channel depths.

16. A method as recited in claim 15 wherein:
    the length of the initial segment is about two times the length of the second channel.

* * * * *

UNITED STATES PATENT AND TRADEMARK OFFICE
CERTIFICATE OF CORRECTION

PATENT NO.    : 6,513,963 B2
DATED         : February 4, 2003
INVENTOR(S)   : Stephen J. Derezinski It is certified that error appears in the above-identified patent and that said Letters Patent is hereby corrected as shown below:

<u>Column 10,</u>
Lines 40 and 63, please replace the text "length of second channel." with the following corrected text -- length of second segement. --

Signed and Sealed this

Eighth Day of July, 2003

JAMES E. ROGAN
*Director of the United States Patent and Trademark Office*